United States Patent
Liu et al.

(10) Patent No.: US 10,909,421 B2
(45) Date of Patent: Feb. 2, 2021

(54) TRAINING METHOD FOR PHASE IMAGE GENERATOR AND TRAINING METHOD OF PHASE IMAGE CLASSIFIER

(71) Applicant: INDUSTRIAL TECHNOLOGY RESEARCH INSTITUTE, Hsinchu (TW)

(72) Inventors: Chun-Wei Liu, Tainan (TW); Luan-Ying Chen, Beidou Township (TW); Kao-Der Chang, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 147 days.

(21) Appl. No.: 16/223,789

(22) Filed: Dec. 18, 2018

(65) Prior Publication Data
US 2020/0193224 A1  Jun. 18, 2020

(30) Foreign Application Priority Data
Dec. 13, 2018 (TW) .............................. 107144986 A

(51) Int. Cl.
*G06K 9/62* (2006.01)
*G06N 3/04* (2006.01)
*G06K 9/66* (2006.01)

(52) U.S. Cl.
CPC ......... *G06K 9/6256* (2013.01); *G06K 9/6267* (2013.01); *G06N 3/0454* (2013.01); *G06K 9/66* (2013.01)

(58) Field of Classification Search
CPC ...... G06N 3/0454; G06K 9/66; G06K 9/6256; G06K 9/6267
(Continued)

(56) References Cited

U.S. PATENT DOCUMENTS 9,971,958 B2    5/2018  Liu et al.
2014/0365397 A1  12/2014  Mitra et al.
(Continued)

FOREIGN PATENT DOCUMENTS

CN    102890747 A    1/2013
CN    203768697 U    8/2014
(Continued)

OTHER PUBLICATIONS

Chen et al., "Deep Spectral-Spatial Feature Extraction Based on DCGAN for Hyperspectral Image Retrieval", 2017 IEEE 15th Intl Conf on Dependable, Autonomic and Secure Computing, 15th Intl Conf on Pervasive Intelligence and Computing, 3rd Intl Conf on Big Data Intelligence and Computing and Cyber Science and Technology Congress, 2017, pp. 752-759.
(Continued)

*Primary Examiner* — Daniel G Mariam
(74) *Attorney, Agent, or Firm* — Birch, Stewart, Kolasch & Birch, LLP

(57) ABSTRACT

The training method for the phase image generator includes the following steps. Firstly, in each iteration, a loss value is generated, including: (1). the phase image generator generates a plurality of generated phase images using a phase image generation mode; (2). the phase image determiner determines a degree of difference between the generated phase images and original phase images; (3). the loss value of the generated phase images is generated according to the degree of difference. Then, a selector selects a stable loss value from the loss values, and uses the phase image generation mode in the iteration corresponding to the stable loss value as a selected phase image generation mode of the phase image generator.

20 Claims, 6 Drawing Sheets

(58) Field of Classification Search
USPC .......................................................... 382/159
See application file for complete search history.

(56) References Cited

U.S. PATENT DOCUMENTS

| | | | | |
|---|---|---|---|---|
| 2018/0075581 | A1* | 3/2018 | Shi | G06N 3/084 |
| 2018/0225823 | A1 | 8/2018 | Zhou et al. | |
| 2019/0289257 | A1* | 9/2019 | Schroers | G06T 5/50 |

FOREIGN PATENT DOCUMENTS

| | | |
|---|---|---|
| CN | 104408692 A | 3/2015 |
| CN | 104766100 A | 7/2015 |
| CN | 107154023 A | 9/2017 |
| CN | 107220600 A | 9/2017 |
| CN | 107451994 A | 12/2017 |
| TW | 201336474 A | 9/2013 |

OTHER PUBLICATIONS

Guei et al., "Deep learning enhancement of infrared face images using generative adversarial networks", Applied Optics, vol. 57, No. 18, Jun. 20, 2018, pp. D98-D107.

Liu et al., "Coupled Generative Adversarial Networks", arXiv:1606.07536v2 [cs.CV], Sep. 20, 2016, 32 pages.

Radford et al., "Unsupervised Representation Learning With Deep Convolutional Generative Adversarial Networks", arXiv:1511.06434v2 [cs.LG], Jan. 7, 2016, pp. 1-16.

Reed et al., "Generative Adversarial Text to Image Synthesis", arXiv:1605.05396 [cs.NE], 2016, 10 pages.

Zhang et al., "StackGAN: Text to Photo-realistic Image Synthesis with Stacked Generative Adversarial Networks", arXiv:1612.03242v2 [cs.CV], Aug. 5, 2017, pp. 1-14.

Taiwanese Office Action and Search Report for Taiwanese Application No. 107144986, dated Nov. 20, 2019.

* cited by examiner

TRAINING METHOD FOR PHASE IMAGE GENERATOR AND TRAINING METHOD OF PHASE IMAGE CLASSIFIER

This application claims the benefit of Taiwan application Serial No. 107144986, filed Dec. 13, 2018, the disclosure of which is incorporated by reference herein in its entirety.

TECHNICAL FIELD

This disclosure relates to a training method and a training method for phase image generator and training method of phase image classifier.

BACKGROUND

In the conventional classification method, the classifier must analyze several samples and then, from these samples, learn the characteristics of the categories to which the samples belong. After the learning is completed, the classifier can analyze a to-be-classified sample and determine which category the to-be-classified sample to be classified belongs to. However, to achieve high classification accuracy, the classifier must analyze a large number of samples. In other words, when the number of the samples is insufficient, the classifier's classification accuracy will be low.

SUMMARY

According to one embodiment of the present disclosure, a training method for a phase image generator is provided. The training method includes the following steps. In each of a plurality of iterations, a loss value is generated, and each iteration includes: a plurality of generated phase images are generated by the phase image generator in a phase image generation mode; degree of difference between the generated phase images and a plurality of original phase images is determined by a phase image determiner; and the loss value of the generated phase images is generated according to the degree of the difference; and a stable loss value is selected by a selector from the loss values and the phase image generation mode in the iteration corresponding to the stable loss value is used as a selected phase image generation mode of the phase image generator.

According to another embodiment of the present disclosure, a training method for a phase image classifier is provided. The training method includes the following steps. a selected phase image generation mode of a phase image generator is obtained by using the training method as described above; a plurality of training phase images is generated by the phase image generator in the selected phase image generation mode; and the training phase images are input by the phase image generator to the phase image classifier to train the phase image classifier.

The above and other aspects of this disclosure will become better understood with regard to the following detailed description of the preferred but non-limiting embodiments. The following description is made with reference to the accompanying drawings.

DETAILED DESCRIPTION

Figure 1:
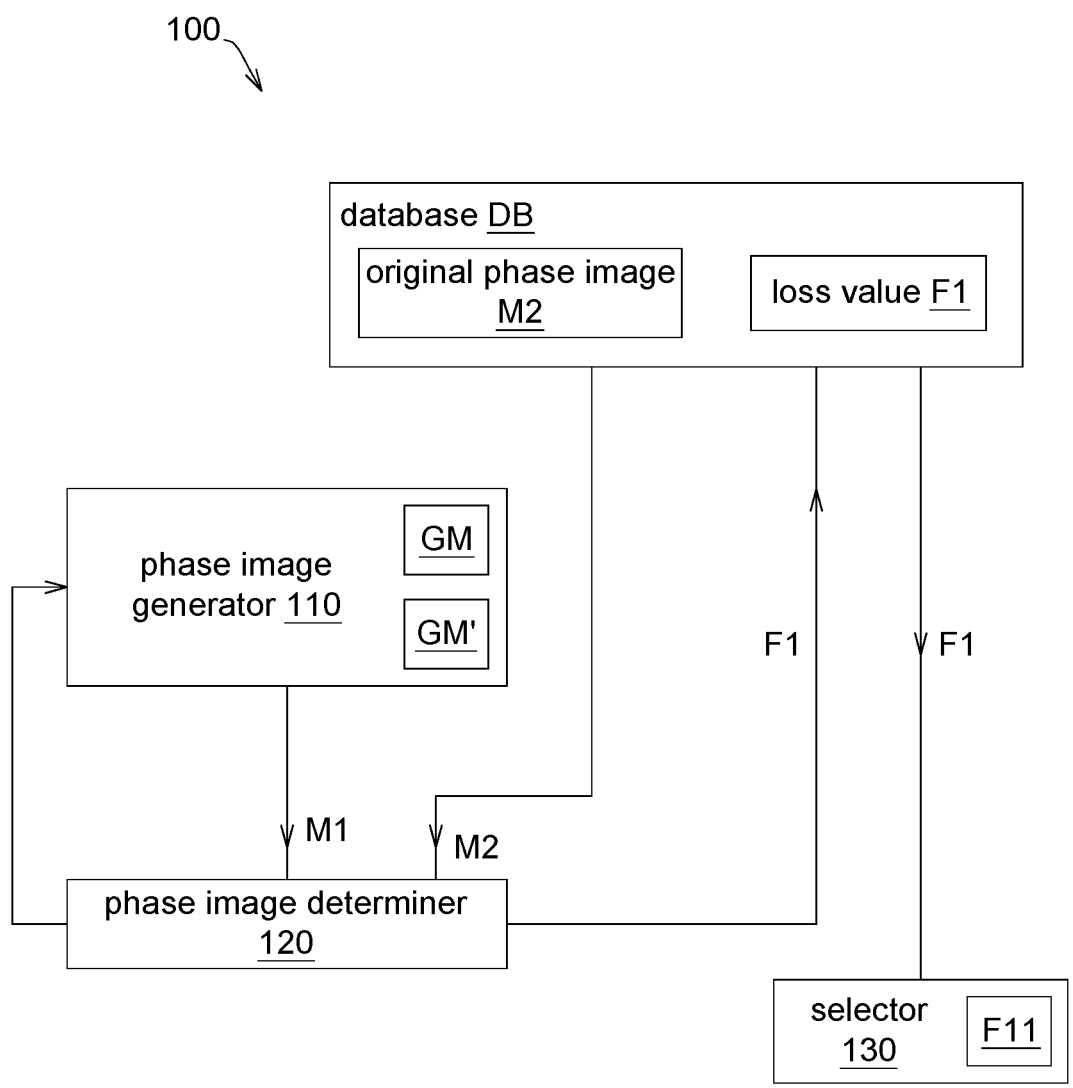
FIG. 1 is a functional block diagram of a training apparatus of a phase image generator according to an embodiment of the present disclosure.
Figure 2:
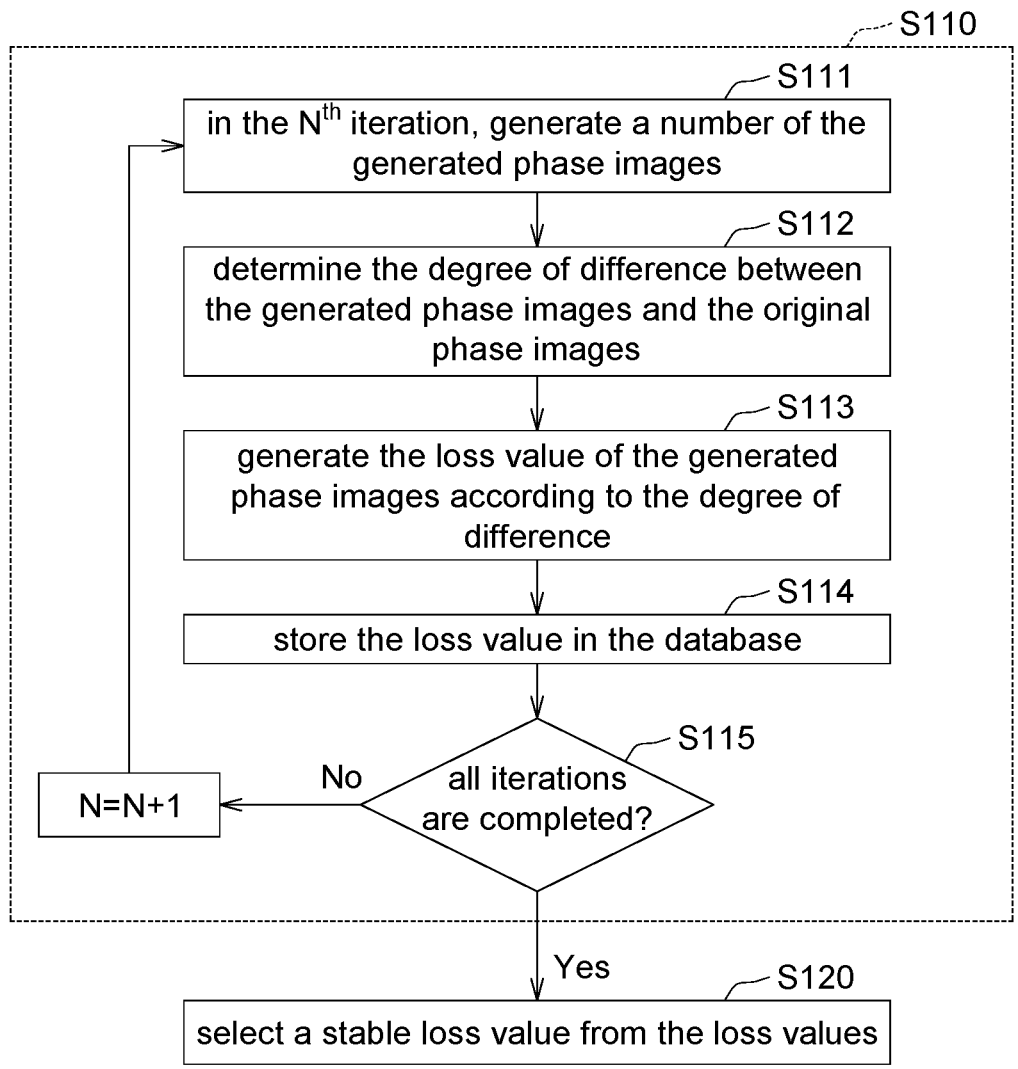
FIG. 2 is a flow chart of the training method of the phase image generator of the training apparatus of FIG. 1.
Figure 3:
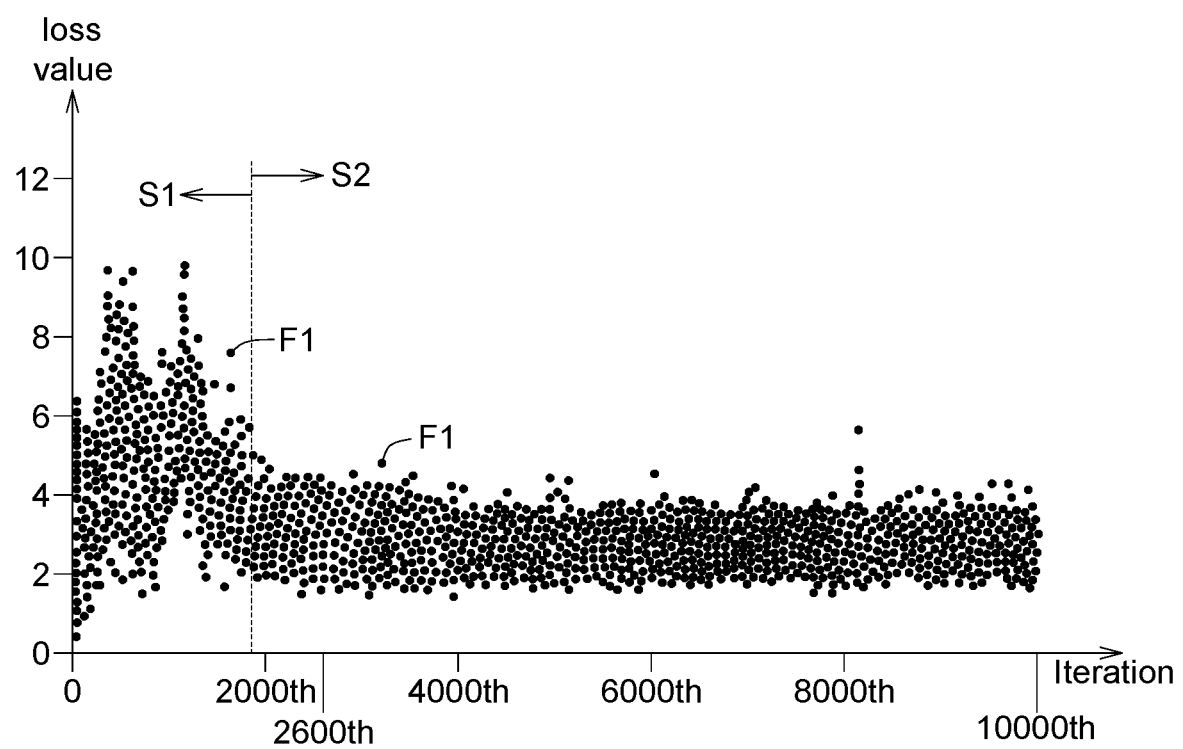
FIG. 3 is a diagram of the distribution of the loss values generated by the training apparatus of FIG. 1 in all the iterations during the training.

Referring to FIGS. 1 to 3, FIG. 1 is a functional block diagram of a training apparatus 100 of a phase image generator according to an embodiment of the present disclosure, FIG. 2 is a flow chart of the training method of the phase image generator of the training apparatus 100 of FIG. 1, and FIG. 3 is a diagram of the distribution of the loss values generated by the training apparatus 100 of FIG. 1 in all iterations during the training.

As shown in FIG. 1, the training device 100 includes a phase image generator 110, a phase image determiner 120 and a selector 130. The phase image generator 110, the phase image determiner 120 and the selector 130 may be circuit structures formed using at least one semiconductor process. At least two of the phase image generator 110, the phase image determiner 120 and the selector 130 can be integrated into a single component. At least one of the phase image generator 110, the phase image determiner 120, and the selector 130 may be integrated into a process (not shown), such as a central processing unit (CPU). In this example, at least one of the phase image generator 110, the phase image determiner 120 and the selector 130 may be a software, firmware or circuit structure. In an embodiment, the phase image generator 110, the phase image determiner 120 and the selector 130 can implement their functions using a Generative Adversarial Network (GAN) technique.

The flow of training the phase image generator 110 using the training device 100 will be described below with reference to FIG. 2.

In the step S110, in each of a number of iterations, the training device 100 may generate a loss value F1 using the GAN technique. This step may be completed by various methods, and one of these methods will be described in the steps S111 to S115. The process of the steps S111 to S115 is an iteration process, and the process of the steps S111 to S115 is repeated for each iteration.

In the step S111, in the $N^{th}$ iteration, the phase image generator 110 generates a number of generated phase images M1 in the phase image generation mode GM'. The initial value of N is 1. Each generated phase image M1 is, for example, an image having interference stripes.

In the step S112, the phase image determiner 120 determines the degree of difference between the generated phase images M1 and the original phase images M2. The original phase image M2 may be stored in the database DB in advance. The original phase image M2 is, for example, an image having interference stripes. Furthermore, in the present embodiment, the number of original phase images M2 is equal to the number of generated phase images M1, but in other embodiment, the number of the original phase images M2 may be different from the number of the generated phase images M1. All original phase images M2 belong to the same category of images, for example, each original phase images M2 has curved interference stripes, a specific or fixed number of interference stripes or stripes having other geometric forms.

In the step S113, the phase image determiner 120 generates the loss value F1 of the generated phase image M1 according to the degree of difference. The loss value F1 is generated, for example, by the phase image determiner 120 using a GAN technique via a loss function calculation. One loss value F1 is generated in one iteration, which is shown in dot form in FIG. 3. In the present embodiment, the loss function may be a hinge loss function or a cross-entropy loss function. The cross-entropy loss function is, for example, a sigmoid cross-entropy loss function or a softmax cross-entropy loss function, which is not limited to those examples. In addition, the phase image determiner 120 may feed the loss value F1 and/or the related GAN information of the generated phase image M1 back to the phase image generator 110 for reference of generating a number of the generated phase images M1 in next iteration. The degree of difference between the generated phase images M1 generated by the next iteration and the original phase images M2 is reduced, and the variability in the generated phase images M1 is also reduced.

In the step S114, the phase image determiner 120 stores the loss value F1 in the database DB as shown in FIG. 1.

In the step S115, the phase image generator 110 determines whether or not all iterations are completed. The embodiment of the present disclosure does not limit the total number of iterations, and as long as the loss function enters the stable region S2, the total number of iterations may be any positive integer greater than one. If all iterations have not been completed yet, the value of N is accumulated (for example, N=N+1), and then the process returns to the step S111, and the process of the steps S111 to S115 is repeated until all iterations are completed.

In different iteration, the phase image generator 110 generates a number of the generated phase images M1 in different phase image generation modes GM', and thus the generated phase images M1 generated in different iteration are not completely identical. In addition, in one iteration, the phase image generation mode GM' used by the phase image generator 110 can be adjusted according to information (such as the loss value F1) fed back by the phase image determiner 120 in previous iteration, such that the generated phase image M1 generated in the next iteration is closer to the original phase image M2.

If the phase image generator 110 determines that all iterations have been completed, the process proceeds to the step S120. As shown in FIG. 3, it shows the distribution of all loss values F1 (called the loss function) generated in all iterations. In FIG. 3, one iteration corresponds to one dot. As shown, as the number of iterations increases, the loss function enters a steady change (such as in stable region S2) from an initial unstable change (such as in unstable region S1). As the number of iterations increases, the degree of difference between the generated phase image M1 and the original phase image M2 generated by the phase image generator 110 reduces (and the generated phase image M1 becomes clearer), and however, the variability in the generated phase images M1 is reduced.

In the step S120, after all iterations are completed, the selector 130 selects one stable loss value F11 from the loss values F1 of the stable region S2, and the phase image generation mode GM' in the iteration corresponding to the stable loss value F11 is used as a selected phase image generation mode GM of the phase image generator 110. For example, as shown in FIG. 3, the selector 130 may select any loss value F1 in the stable region S2 as the steady loss value F11. For example, assuming that the steady loss value F11 is the loss value F1 of the 2600th iteration, the phase image generation mode GM' used in the 2600th iteration is used as the selected phase image generation mode GM to complete the training of the phase image generator 110. In an embodiment, the selected phase image generation mode GM is, for example, an initial stage of the stable region S2. Therefore, in compare with the phase image generation mode GM corresponding to the middle stage and late stage of the stable region S2, the variability in the phase generation images M1 generated by the phase image generator 110 in the selected phase image generation mode GM (corresponding to the initial stage of the stable region S2) is larger. Furthermore, the required data (for example, all loss value F1) for obtaining the stable loss value F11 by the selector 130 can be obtained from the database DB.

Figure 4:
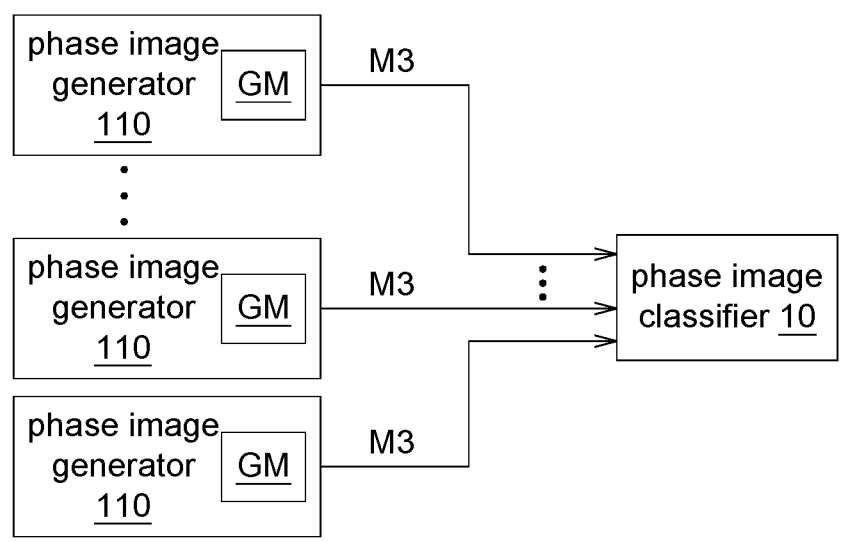
FIG. 4 is a schematic diagram of training of the phase image classifier according to an embodiment of the present disclosure.

FIG. 4 is a schematic diagram of training of the phase image classifier 10 according to an embodiment of the present disclosure. After the selected phase image generation mode GM is determined, the phase image generator 110 generates a number of training phase images M3 using the selected phase image generation mode GM, and the training phase images M3 generated by the same phase image generator 110 belong to the same category. The training phase images M3 generated by the phase image generator 110 are inputted to the phase image classifier 10 to train the phase image classifier 10. The phase image classifier 10 can learn the characteristics of the training phase images M3. After the training or learning is completed, the phase image classifier 10 can determine or recognize whether a to-be-classified phase image belongs to the category to which the training phase images M3 belong. In an embodiment, the number of sheets of the training phase image M3 used by the training phase image classifier 10 is sufficient, such as 1000 sheets, less or more, so that the classification accuracy of the phase image classifier 10 can be up to 95% or higher, such as 99% or higher.

During the training process of the phase image generator 110, the number of sheets of the original phase image M2 in the step S112 may be less than the number of sheets of the training phase image M3 used by the training phase image classifier 10 of FIG. 4. In an embodiment, it is assumed that the phase image classifier 10 needs X sheets of the phase image to perform the training (or learning) in order to obtain a classification accuracy rate. The disclosed embodiment only needs to less sheets of the original phase images M2 than X sheets, and then the phase image generator 110 trains the phase image classifier 10 using the phase image generator 110 to achieve the same classification correctness.

In detail, even if the phase image generator 110 trained using a less number of the original phase images M2 is used, such phase image generator 110 can train the phase image classifier 10 having a high classification accuracy rate. In an embodiment, the ratio of the number of sheets of the training phase image M3 to the number of sheets of the original phase image M2 is any integer ranging between 1 and R, where R is any integer greater than 1, such as 2, 3, 4 or larger.

In addition, the phase image classifier 10 can be trained using neural network (NN) technique, such as Convolution Neural Networks (CNN) or deep neural networks (DNN). The phase image classifier 10 is, for example, a circuit structure formed by at least one semiconductor process, or a software or a firmware. The phase image classifier 10 may be integrated into a central processing unit (CPU) (not shown), or at least two of the phase image generator 110, the phase image determiner 120 and the selector 130 may be integrated into a single component.

In addition, as shown in FIG. 4, each phase image generator 110 can generate a number of the training phase images M3 to the phase image classifier 10 in the selected phase image generation mode GM. Each phase image generator 110 can obtain and determine the corresponding selected phase image generation mode GM using the processes of FIG. 2 according to the original phase image M2 belonging to different category. The different phase image generators 110 can generate the training phase images M3 belonging to different category. As a result, after a number of the phase image classifiers 10 trained by a number of the phase image generators 110 corresponding to different categories are trained completely, the phase image classifiers 10 can determine and recognize whether a to-be-classified phase image belongs to these categories, or can determine and recognize the to-be-classified phase image belongs to which one of these categories.

Figure 5:
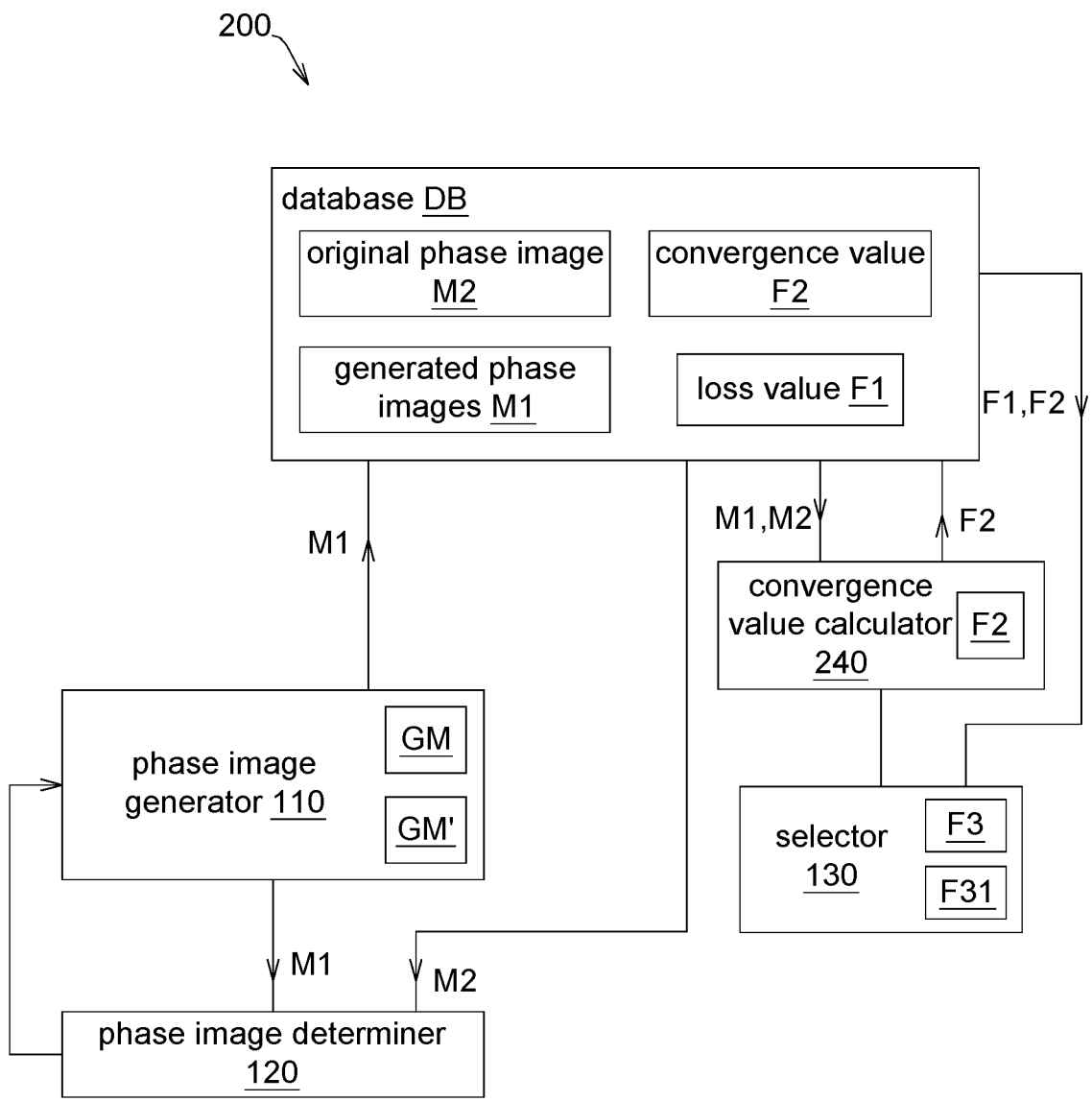
FIG. 5 is a functional block diagram of the training device of the phase image generator according to another embodiment of the present disclosure.
Figure 6:
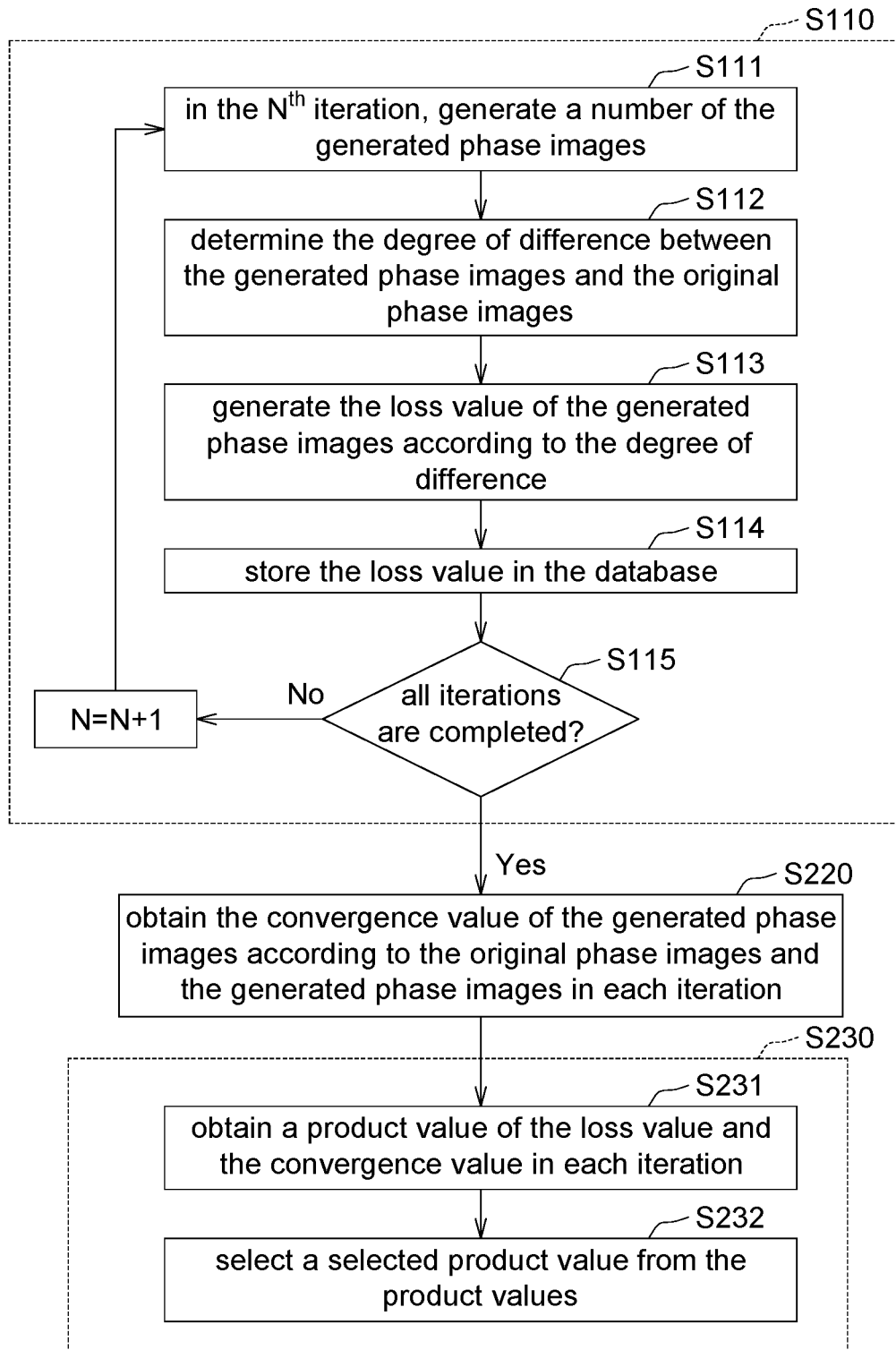
FIG. 6 is a flow chart of the training process of the phase image generator of the training device of FIG. 5.

Referring to FIGS. 5-6, FIG. 5 is a functional block diagram of the training device 200 of the phase image generator 110 according to another embodiment of the present disclosure, and FIG. 6 is a flow chart of the training process of the phase image generator 110 of the training device 200 of FIG. 5.

As shown in FIG. 5, the training device 200 includes the phase image generator 110, the phase image determiner 120, the selector 130 and a convergence value calculator 240. The phase image generator 110, the phase image determiner 120, the selector 130 and/or the convergence value calculator 240 may be a circuit structure formed using at least one semiconductor process. At least two of the phase image generator 110, the phase image determiner 120, the selector 130 and the convergence value calculator 240 may be integrated into a single component. At least one of the phase image generator 110, the phase image determiner 120, the selector 130 and the convergence value calculator 240 may be integrated into a processor (not shown), such as a CPU. In an embodiment, the phase image generator 110, the phase image determiner 120, the selector 130 and the convergence value calculator 240 may be implemented using GAN technique.

In the step S110, in each iteration, the training device 200 may use the GAN technique to generate the loss value F1. There are various ways to complete this step. One of these methods will be described in the steps S111 to S115. The steps S111 to S115 are a process of one iteration, and the process of the steps S111 to S115 is repeated in other iteration.

In the step S111, in the Nth iteration, the phase image generator 110 generates a number of the generated phase images M1 in the phase image generation mode GM'. The initial value of N is 1. The generated phase image M1 is, for example, an image having at least one interference strip. Then, the phase image generator 110 may store the generated phase image M1 in the database DB for reference of calculating the convergence value by the convergence value calculator 240.

In the step S112, the phase image determiner 120 determines the degree of difference between the generated phase images M1 and the original phase images M2. The original phase image M2 may be pre-stored in the database DB. The original phase image M2 is, for example, an image having at least one interference stripe. Furthermore, in the present embodiment, the number of the original phase images M2 is equal to the number of the generated phase images M1, but in other embodiment, the number of the original phase images M2 may be different from the number of the generated phase images M1. All original phase images M2 belong to the same category, for example, each original phase images M2 has at least one curved interference stripe, a specific or fixed number of interference stripes or stripes having other geometric forms.

In step S113, the phase image determiner 120 generates the loss value F1 of the generated phase images M1 according to the degree of difference. The loss value F1 is generated by the phase image determiner 120 using, for example, GAN technique via a loss function operation. One loss value F1 is generated for one iteration. In addition, the phase image determiner 120 may feed the loss value F1 and/or the related GAN information of the generated phase images M1 back to the phase image generator 110 for reference of the phase image generator 110 generating a number of the generated phase images M1 in the next iteration. The degree of difference between the generated phase images M1 generated in next iteration and the original phase images M2 is reduced, and the variability in the generated phase images M1 is also reduced.

In the step S114, the phase image determiner 120 stores the loss value F1 in the database DB as shown in FIG. 5.

In the step S115, the phase image generator 110 determines whether or not all iterations are completed. If all iterations have not been completed, the value of N is accumulated (for example, N=N+1), and then the process returns to the step S111, and the process of the steps S111 to S115 is repeated until all iterations are completed.

If the phase image generator 110 determines that all iterations have been completed, the process proceeds to the step S220. The distribution of all loss values F1 (called the loss function) produced in all iterations of the present embodiment is similar to that shown in FIG. 3. As shown, as the number of iterations increases, the loss function enters the steady change (for example, in stable region S2) from the initial unstable change (for example, in unstable region S1). As the number of iterations increases, the degree of difference between the generated phase image M1 and the original phase image M2 generated by the phase image generator 110 reduces (and the generated phase image M1 becomes clearer), However, the variability between the generated phase images M1 is reduced.

In the step S220, the convergence value calculator 240 obtain the convergence value F2 of the generated phase images M1 according to the original phase images M2 and the generated phase images M1 in each iteration. Furthermore, the required data (such as the original phase image M2 and the generated phase images M1) for obtaining the convergence value F2 by the convergence value calculator 240 can be obtained from the database DB. In the present embodiment, the convergence value calculator 240 is, for example, a KL divergence value calculator, and the convergence value F2 is, for example, a KL divergence value. The convergence value calculator 240 may obtain the KL divergence value using KL divergence statistical operation. The smaller the value of the KL divergence value is, the smaller the degree of difference between the original phase image M2 and the generated phase image M1 is. In detail, each of the generated phase image M1 and the original phase image M2 is, for example, image having at least one interference strip, and the KL divergence value calculator (for example, convergence value calculator 240) performs the KL divergence statistical method according to distributions of the interference stripes of the generated phase image M1 and the original phase image M2. The calculation formula is as follows:

$$D_{KL}(P \parallel Q) = \sum_i P(i) \ln \frac{P(i)}{Q(i)}$$

where P(i) represents the distribution of the strips of the original phase image M2, Q(i) represents the distribution of the strips of the generated phase image M1, and $D_{KL}$ is obtained by calculating and represents the KL divergence value as the convergence value F2.

Then, the convergence value calculator 240 can store the convergence value F2 in the database DB. In another embodiment, the step S220 may also be performed in step S110. For example, step S220 may be performed between the steps S112 and S115. In another embodiment, the step 220 may also be performed in synchronization with the step S112, and is not limited to those embodiments.

In the step S230, after all iterations are completed, the selector 130 selects one stable loss value F11 from the plurality of loss values F1 in the stable region S2, and the phase image generation mode GM' in the iteration corresponding to the stable loss value F11 is used as the selected phase image generation mode GM of the phase image generator 110. The step S230 of the present embodiment may be completed using various method, and one of the methods will be described in steps S231 to S232.

In the step S231, the selector 130 may obtain the product value F3 of the loss value F1 and the convergence value F2 in each iteration using the following equation (1). One iteration will produce one product value F3. Therefore, m iterations will have m product values F3, where m may be any positive integer greater than 1, such as any positive integer between 2 and 1000000. However, m also may be larger than 1000000.

$$F3 = F1 \times F2 \quad (1)$$

In the step S232, the selector 130 selects one selected product value F31 from the product values F3, and uses the loss value F1 corresponding to the selected product value F31 as the steady loss value F11. The selector 130 takes the steady loss value F11 corresponding to the phase image generation pattern GM' in the iteration as a selected phase image generation pattern GM of the phase image generator 110. In addition, the required data (for example, the loss value F1 and the convergence value F2) for obtaining the selected product value F31 by the selector 130 can be obtained from the database DB.

In an embodiment, the selected product value F31 may be the smallest of the product values F3. In the present embodiment, as shown in FIG. 3, the selected product value F31 (the minimum product value) corresponds to the iteration, for example, the 2000th iteration. In the initial stage of the stable region S2, due to the number of the iterations being less, the degree of variation of the generated phase images M1 (or the training phase images M3) generated by the phase image generator 110 is large.

After the selected phase image generation mode GM is determined, the phase image generator 110 can train the phase image classifier 10 by way similarly to or the same as that as described above, and details are not repeated herein. The training phase images M3 generated by the phase image generator 110 in the selected phase image generation mode GM have the variability, and thus the phase image classifier 10 can be trained to obtain high classification accuracy. Furthermore, the loss value F1 represents the degree of similarity between the generated phase image M1 and the original phase image M2. In the stable region S2, as the loss value F1 reduces, the degree of similarity between the generated phase image M1 and the original phase image M2 increases. The convergence value F2 represents the degree of similarity between the generated phase image M1 and the original phase image M2 on the distribution of the interference stripes. By selecting the smallest product value F3 (that is, value of F1×F2), it can be ensured that the phase image generator 110 trained in selected iteration can generate the training phase images M3 similar to the original phase images M2, and these training phase images M3 have sufficient variability to train the phase image classifier 10.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A training method for a phase image generator, comprising:
   in each of a plurality of iterations, a loss value is generated by using a Generative Adversarial Network (GAN) technique, and each iteration comprises:
   generating a plurality of generated phase images in a phase image generation mode by the phase image generator;
   determining a degree of difference between the plurality of generated phase images and a plurality of original phase images by a phase image determiner; and
   generating the loss value of the plurality of generated phase images according to the degree of difference; and
   selecting a stable loss value from the loss values by a selector, and using the phase image generation mode in the iteration corresponding to the stable loss value as a selected phase image generation mode of the phase image generator.

2. The training method according to claim 1, further comprises:
   obtaining a convergence value of the generated phase images by a convergence value calculator according to the plurality of original phase images and the plurality of generated phase images in each iteration;
   wherein the step of selecting the stable loss value from the loss values by the selector further comprises:
   obtaining a product value of the loss value and the convergence value by the selector in each iteration; and
   selecting a selected product value from the product values by the selector, and using the loss value corresponding to the selected product value as the stable loss value.

3. The training method according to claim 2, wherein the convergence value calculator is a Kullback Leibler (KL) divergence value calculator, and the convergence value is a KL divergence value.

4. The training method according to claim 3, wherein the convergence value is obtained by the convergence value calculator using the KL divergence statistical operation according to the plurality of original phase images and the plurality of generated phase images in each iteration.

5. The training method according to claim 2, wherein the selected product value is the smallest one of the product values.

6. The training method according to claim 2, further comprises:
   storing the plurality of original phase images in a database; and after the plurality of generated phase images are generated, storing the plurality of generated phase images in the database;

wherein in the step of obtaining the convergence value of the generated phase images by the convergence value calculator according to the plurality of original phase images and the plurality of generated phase images in each iteration, the plurality of original phase images and the plurality of generated the phase images are obtained by the convergence value calculator from the database.

7. The training method according to claim 2, further comprises:

storing the convergence value in a database by the convergence value calculator; and wherein the step of generating the loss value in each iteration, further comprises: after the loss value is generated, storing the loss value in the database;

wherein in step of obtaining the product value of the loss value and the convergence value by the selector in each iteration, the loss values and the convergence value are obtained by the selector from the database.

8. The training method according to claim 1, wherein the step of generating the loss value of the plurality of generated phase images according to the degree of the difference further comprises: generating the loss value using a loss function operation by the phase image determiner.

9. The training method according to claim 1, wherein the step of generating the phase image generation mode in each iteration further comprises:

after the loss value is generated, storing the loss value in a database;

wherein in the step of selecting the stable loss value from the loss values by the selector, the stable loss value is obtained by the selector obtained from the loss values stored in the database.

10. A training method for a phase image classifier, comprising:

obtaining a selected phase image generation mode of a phase image generator by using the training method according to claim 1;

generating a plurality of training phase images in the selected phase image generation mode by the phase image generator; and inputting the plurality of training phase images to the phase image classifier by the phase image generator to train the phase image classifier.

11. The training method according to claim 10, wherein a number of sheets of the plurality of original phase images is less than the number of sheets of the plurality of training phase images.

12. The training method according to claim 10, wherein the phase image classifier is trained using Neural Networks (NN) technique.

13. The training method according to claim 10, wherein the step of obtaining the selected phase image generation mode of the phase image generator further comprises:

obtaining a convergence value of the generated phase images by a convergence value calculator according to the plurality of original phase images and the plurality of generated phase images in each iteration;

wherein the step of selecting the stable loss value from the loss values by the selector further comprises:

obtaining a product value of the loss value and the convergence value by the selector in each iteration; and selecting a selected product value from the product values by the selector, and using the loss value corresponding to the selected product value as the stable loss value.

14. The training method according to claim 13, wherein in the step of obtaining the selected phase image generation mode of the phase image generator, the convergence value calculator is a Kullback Leibler (KL) divergence value calculator, and the convergence value is a KL divergence value.

15. The training method according to claim 14, in the step of obtaining the selected phase image generation mode of the phase image generator, the convergence value is obtained by the convergence value calculator using the KL divergence statistical operation according to the plurality of original phase images and the plurality of generated phase images in each iteration.

16. The training method according to claim 13, wherein in the step of obtaining the selected phase image generation mode of the phase image generator, the selected product value is the smallest one of the product values.

17. The training method according to claim 13, wherein the step of obtaining the selected phase image generation mode of the phase image generator further comprises:

storing the plurality of original phase images in a database; and after the plurality of generated phase images are generated, storing the plurality of generated phase images in the database;

wherein in the step of obtaining the convergence value of the generated phase images by the convergence value calculator according to the plurality of original phase images and the plurality of generated phase images in each iteration, the plurality of original phase images and the plurality of generated the phase images are obtained by the convergence value calculator from the database.

18. The training method according to claim 13, wherein the step of obtaining the selected phase image generation mode of the phase image generator further comprises:

storing the convergence value in a database by the convergence value calculator; and wherein the step of generating the loss value in each iteration, further comprises: after the loss value is generated, storing the loss value in the database;

wherein in step of obtaining the product value of the loss value and the convergence value by the selector in each iteration, the loss values and the convergence value are obtained by the selector from the database.

19. The training method according to claim 10, wherein the step of obtaining the selected phase image generation mode of the phase image generator further comprises:

after the loss value is generated, storing the loss value in a database;

wherein in the step of selecting the stable loss value from the loss values by the selector, the stable loss value is obtained by the selector obtained from the loss values stored in the database.

20. The training method according to claim 10, wherein the step of generating the loss value of the plurality of generated phase images according to the degree of the difference further comprises: generating the loss value using a loss function operation by the phase image determiner.

* * * * *